(12) United States Patent  (10) Patent No.: US 12,498,401 B2
Wada et al.  (45) Date of Patent: Dec. 16, 2025

(54) CURRENT SENSOR

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Shotaro Wada, Nisshin (JP); Yoshikazu Furuta, Nisshin (JP); Tomohiro Nezuka, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 88 days.

(21) Appl. No.: 18/448,668

(22) Filed: Aug. 11, 2023

(65) Prior Publication Data

US 2024/0061019 A1  Feb. 22, 2024

(30) Foreign Application Priority Data

Aug. 22, 2022 (JP) .................. 2022-131805

(51) Int. Cl.
  *G01R 1/20* (2006.01)
  *G01R 15/14* (2006.01)
(52) U.S. Cl.
  CPC .................. *G01R 15/146* (2013.01)
(58) Field of Classification Search
  CPC .. G01R 33/04; G01R 33/063; G01R 33/0017; G01R 33/072; G01R 33/0076; G01R 33/09; G01R 33/091; G01R 33/093; G01R 33/098; G01R 1/203; G01R 19/0092; G01R 19/003; G01R 19/16509; G01R 19/16504; G01R 15/146; G01R 15/185; G01R 15/202; G01R 15/203; G01R 15/205; G01R 15/207
  See application file for complete search history.

(56) References Cited

U.S. PATENT DOCUMENTS 6,909,275 B2  6/2005 Hartzsch
8,779,777 B2  7/2014 Irmer et al.
(Continued)

FOREIGN PATENT DOCUMENTS

DE  10310503 A1  9/2004
JP  62-168067 A  7/1987
JP  2010-008121 A  1/2010

*Primary Examiner* — Thang X Le
(74) *Attorney, Agent, or Firm* — Posz Law Group, PLC

(57) ABSTRACT

A current sensor includes a current detection unit, a relay, a relay control unit, and a resistance value correction circuit. The current detection unit detects a detection target current based on a terminal voltage of a shunt resistor located in series with a path through which the detection target current flows and a detection resistance value for current detection corresponding to a resistance value of the shunt resistor. The relay is located in series with the path through which the detection target current flows. The relay control unit controls the relay to be turned on or off. The resistance value correction circuit calculates the resistance value of the shunt resistor as a calculated resistance value and corrects the detection resistance value based on the calculated resistance value.

9 Claims, 9 Drawing Sheets

(56) References Cited

U.S. PATENT DOCUMENTS

| | | |
|---|---|---|
| 8,947,101 B2 | 2/2015 | Engl |
| 9,632,163 B2 | 4/2017 | Mueller et al. |
| 10,473,724 B2 | 11/2019 | Aumer et al. |
| 2015/0177291 A1* | 6/2015 | Kageyama ............ G01R 19/32 |
| | | 324/105 |
| 2017/0089955 A1* | 3/2017 | Yugou .................. B60L 3/0038 |
| 2020/0233054 A1* | 7/2020 | Asam ....................... G01K 3/10 |
| 2023/0054772 A1* | 2/2023 | Nezuka ................. G01R 1/203 |
| 2023/0318446 A1* | 10/2023 | Cohen ..................... H02M 1/12 |
| | | 363/44 |
| 2024/0061025 A1* | 2/2024 | Angelini ............. G01R 15/146 |

\* cited by examiner

FIG. 9

|    | FIRST STATE | SECOND STATE | THIRD STATE |
|----|-------------|--------------|-------------|
| P1 | DRIVING AND TRAVELLING | — | DURING POWER-OFF |
| P2 | — | DRIVING AND TRAVELLING | DURING POWER-OFF |
| P3 | DRIVING AND TRAVELLING | DRIVING AND PAUSING | DURING POWER-OFF |

CURRENT SENSOR

CROSS REFERENCE TO RELATED APPLICATION

This application is based on Japanese Patent Application No. 2022-131805 filed on Aug. 22, 2022, the disclosure of which is incorporated herein by reference.

TECHNICAL FIELD

The present disclosure relates to a current sensor.

BACKGROUND

A current sensor may detect a detection target current by adopting a terminal voltage of a shunt resistor provided in series with a path through which the detection target current flows and a detection resistance value for current detection corresponding to the resistance value of the shunt resistor.

SUMMARY

The present disclosure describes a current sensor detecting a detection target current by adopting a terminal voltage of a shunt resistor and a resistance value for current detection corresponding to a resistance value of the shunt resistor, and further describes that the current sensor includes a current detection unit, a relay, a relay control unit, and a resistance value correction circuit.

BRIEF DESCRIPTION OF DRAWINGS

FIG. 9 illustrates an example of a switching pattern of each state of a state switchover unit according to the second embodiment.

DETAILED DESCRIPTION

Figure 1:
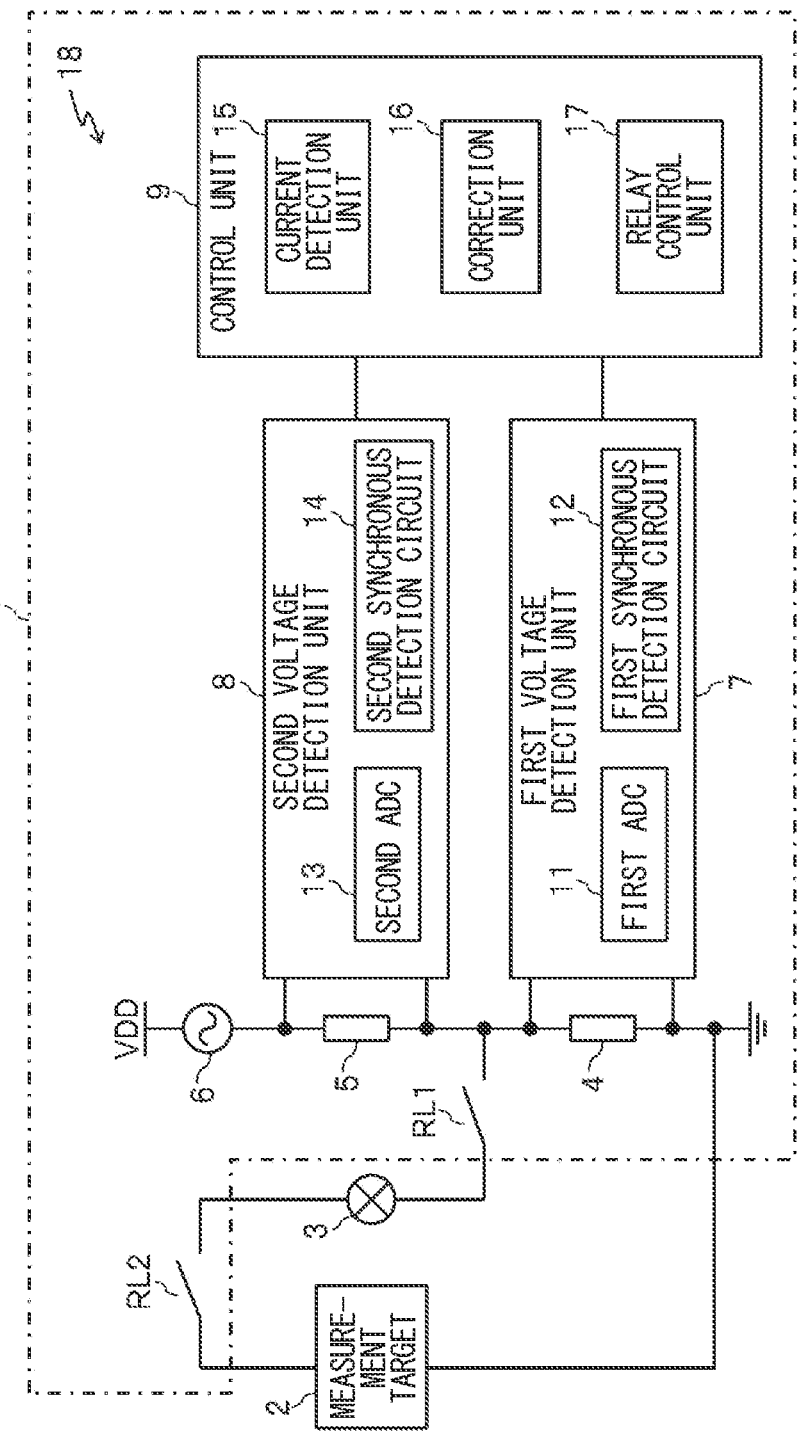
FIG. 1 is a diagram schematically showing a configuration of a current sensor according to a first embodiment.

In a current sensor, a terminal voltage of a shunt resistor provided in series with a path through which a detection target current flows may be measured, and the current as a detection target may be calculated based on the measured voltage and a resistance value for current detection corresponding to the resistance value of the shunt resistor. In this case, since the resistance value of the shunt resistor may change due to deterioration over time or the like, it may be necessary to correct the resistance value for current detection used for calculating the current at any time.

In a first conceivable technique, the resistance value for current detection may be corrected as follows. That is, the first conceivable technique may provide a sub-resistor provided so that a detection target current flows in the sub-resistor, similar to the shunt resistor in a normal state, and a correction resistor provided so that a detection target current does not flow in the correction resistor in a normal time. According to the above configuration, the sub-resistor may deteriorate with time similar to the shunt resistor, but the correction resistor hardly deteriorates with time. In the first conceivable technique, the degree of deterioration of the sub-resistor and the shunt resistor may be obtained by comparing the resistance value of the sub-resistor and the correction resistor at the time of correction, and the resistance value for current detection may be corrected based on the deterioration degree.

In a second conceivable technique, the resistance value for current detection may be corrected as follows. That is, the second conceivable technique has a configuration in which multiple shunt resistors are provided and a correction current is passed from the interconnection nodes of the multiple shunt resistors, or an input terminal is provided in the central portion of the shunt resistor and a correction current is passed from the input terminal. In the second conceivable technique, the terminal voltage of each resistor when a correction current is passed may be measured, and the individual resistance value may be calculated based on the measurement result to correct the resistance value for current detection.

In each of the first and second conceivable techniques, when each measurement for correcting the resistance value for current detection is executed, a current flows through the measurement target. In each of the first and second conceivable techniques, an error may occur in the measurement due to the influence of noise generated in the measurement target, the correction of the resistance value for current detection may not be accurate. As a result, the accuracy of the current detection may decrease. Such noise may be obvious in, for example, a motor and a power converter as the measurement target which may generate relatively large noise. Therefore, it may be difficult to enhance the accuracy of correction of the resistance value for current detection in each of the first and second conceivable techniques.

According to a first aspect of the present disclosure, a current sensor includes a current detection unit, a relay, a relay control unit, and a resistance value correction circuit. The current detection unit detects a detection target current by adopting a terminal voltage of a shunt resistor located in series with a path through which the detection target current flows and a detection resistance value adopted for current detection corresponding to a resistance value of the shunt resistor. The relay is located in series with the path through which the detection target current flows. The relay control unit turns on or off the relay. The resistance value correction circuit calculates the resistance value of the shunt resistor as a calculated resistance, and corrects the resistance value adopted for the current detection based on the calculated resistance value.

According to the above configuration, while the relay is turned on, the current flowing through the measurement target, in other words, the detection target current flows through the shunt resistor. The current detection unit detects the detection target current while the relay is turned on by the relay control unit. Therefore, the current detection unit can detect the detection target current based on a voltage across the terminals of the shunt resistor, in other words, a voltage drop across the shunt resistor with enhanced accuracy.

In the above configuration, the detection target current does not flow to the measurement target while the relay is turned off. The resistance value correction circuit calculates the resistance value of the shunt resistor while the relay is turned off by the relay control unit. The resistance value correction circuit can execute the measurement for calculating the resistance value of the shunt resistor in a state where the detection target current does not flow. The resistance value correction circuit can execute the measurement without being affected by a variety of noises generated by the flow of the detection target current. As a result, it is possible to detect the correction of the resistance value for current detection with enhanced accuracy.

According to a second aspect of the present disclosure, the resistance value correction circuit of the current sensor includes a correction resistor, a signal application unit, a first voltage detection unit, a second voltage detection unit, and a correction unit. The correction resistor is located at a path different from the path through which the detection target current flows. The correction resistor is connected to the shunt resistor in series, and has higher resistance accuracy than the shunt resistor. The signal application unit applies an alternating current signal to a series circuit in which the shunt resistor and the correction resistor are connected in series. The first voltage detection unit detects a value of the terminal voltage of the shunt circuit as a first voltage detection value, while the alternating-current signal is applied to the series circuit. The second voltage detection unit detects a value of a terminal voltage of the correction resistor as a second voltage detection value, while the alternating-current signal is applied to the series circuit. The correction unit calculates the resistance value of the shunt resistor as the calculated resistance based on the first voltage detection value and the second voltage detection value, and corrects the detection resistance value based on the calculated resistance value.

According to such a configuration, it is possible to further enhance the accuracy of correcting the resistance value for current detection as compared with the first and second conceivable techniques. In the first conceivable technique, the shunt resistor is not used for direct correction, and it is assumed that the sub-resistor deteriorates in the same manner as the shunt resistor, and then the sub-resistor is used to indirectly correct the resistance value adopted for the current detection corresponding to the resistance value of the shunt resistor. Therefore, in the first conceivable technique, if the above assumption is not satisfied, the resistance value for current detection may not be corrected with high accuracy, and as a result, the current detection accuracy may decrease. In the second conceivable technique, since it is necessary to provide multiple shunt resistors or to provide an input terminal in the central portion of the shunt resistor, there arises a difficulty that the configuration becomes complicated. Further, in the second conceivable technique, it is difficult to sufficiently improve the accuracy of the correction because the accuracy of the correction of the resistance value for current detection greatly depends on the accuracy of the correction current.

According to such a configuration, it is possible to directly correct the resistance value for detection by using the shunt resistor without indirectly correcting the resistance value for detection by using the sub-resistors as in the first conceivable technique. Further, according to the above configuration, unlike the second conceivable technique, it is not necessary to provide multiple shunt resistors nor to provide an input terminal at the center of the shunt resistors, and only one shunt resistor is required, so that the configuration of the entire current sensor is not complicated.

Further, according to the above configuration, the calculation accuracy of the calculated resistance value and the correction accuracy of the detection resistance value greatly depend on the accuracy of the resistance value of the correction resistor and the detection accuracy of the first voltage detection value and the second voltage detection value. In this case, since the correction resistor is higher in resistance accuracy than the shunt resistor, the correction accuracy of the detection resistance value is sufficiently improved. Therefore, according to the above configuration, it is possible to obtain an excellent effect that the detection resistance value can be corrected with high accuracy without complicating the configuration of the entire current sensor.

The following will describe embodiments of the present disclosure with reference to the accompanying drawings. Hereinafter, in the respective embodiments, substantially the same configurations are denoted by identical symbols, and repetitive description will be omitted.

First Embodiment

The following describes a first embodiment with reference to FIGS. 1 to 7.
(Overall Configuration)

A current sensor 1 of the present embodiment shown in FIG. 1 is adapted to a vehicle such as an automobile, and detects a detection target current which is a current flowing through a measurement target 2. For example, a motor, a battery, and a power converter adapted to a vehicle may be the measurement target 2. The measurement target 2 may be a battery such as a main engine battery that supplies electric power to a drive unit for traveling a vehicle, an auxiliary battery that supplies electric power to an auxiliary device of the vehicle, a power converter such as a DC/DC converter and an inverter. The power converter supplies electric power to a motor that generates a driving force for driving a vehicle, and constitutes the above-mentioned driving unit together with the motor.

In this case, a load 3 is connected in series with the measurement target 2, and the loop circuit is configured by the measurement target 2, the load 3, relays RL1, RL2. When the measurement target 2 is the above-mentioned battery, the load 3 may be, for example, the above-mentioned motor, the above-mentioned power converter, the electric compressor. Further, when the measurement target 2 is the above-mentioned power converter, the load 3 may be, for example, the above-mentioned motor. In the present embodiment, each of the motor and the inverter being the power converter is the measurement target 2. In the present embodiment, at least one of the motor adapted to the vehicle and the power converter for supplying power to the motor is provided at a path through which the detection target current flows.

The current sensor 1 includes a shunt resistor 4, a correction resistor 5, the relays RL1, RL2, a signal application unit 6, a first voltage detection unit 7, a second voltage detection unit 8, and a control unit 9. One terminal of the shunt resistor 4 is connected to one of the terminals of the load 3 via the relay RL1, and the other terminal of the load 3 is connected to the ground which is the reference potential of the circuit and the low potential side terminal of the measurement target 2.

The other terminal of the load 3 is connected to the high potential side terminal of the measurement target 2 via the relay RL2. That is, the shunt resistor 4 is provided in series with the path through which the detection target current flows. Also, the relays RL1 and RL2 are provided so as to be interposed in series with the path through which the detection target current flows. The current sensor 1 detects the detection target current using the terminal voltage of the shunt resistor 4 provided in this way and the resistance value for detection corresponding to the resistance value of the shunt resistor 4.

One terminal of the correction resistor 5 is connected to the signal application unit 6, and the other terminal is connected to the one terminal of the shunt resistor 4. That is, the correction resistor 5 is connected in series with the shunt resistor 4 in a path different from the path through which the detection target current flows. In this case, since the detection target current is a relatively large current, the resistance value of the shunt resistor 4 is a relatively small value, for example, on the order of μΩ.

On the other hand, since a relatively large detection target current does not flow through the correction resistor 5, the resistance value of the correction resistor 5 is relatively large, for example, on the order of m Q. In general, it may be difficult to accurately form a resistor having a small resistance value, but it may be relatively easy to accurately form a resistor having a large resistance value. Therefore, in the present embodiment, the resistance accuracy of the correction resistor 5 is sufficiently higher than the resistance accuracy of the shunt resistor 4.

The signal application unit 6 applies a pulse wave or sinusoidal (alternating current) AC signal to the series circuit of the shunt resistor 4 and the correction resistor 5 at the time of correction when the detection resistance value described later is corrected. In other words, the signal application unit 6 applies the same AC signal to the shunt resistor 4 and the correction resistor 5 at the time of correction. In this case, the signal application unit 6 is configured as a current source for supplying an alternating current to the series circuit from the power supply line 10 to which the power supply voltage VDD of +5V is supplied, for example. Such an operation of the signal application unit 6 is controlled by the control unit 9. In other words, the control unit 9 can control execution and stoppage of application of the AC signal by the signal application unit 6.

The first voltage detection unit 7 detects the terminal voltage of the shunt resistor 4 when an AC signal is applied to the series circuit of the shunt resistor 4 and the correction resistor 5, and includes a first A/D converter 11 and a first synchronous detection circuit 12. In drawings such as FIG. 1, the A/D converter is abbreviated as ADC. The first A/D converter 11 performs the following A/D conversion operation in order to detect the terminal voltage of the shunt resistor 4. That is, the first A/D converter 11 inputs the signal of each terminal of the shunt resistor 4, and by performing A/D conversion of each signal, outputs the difference in the voltage of each terminal of the shunt resistor 4, that is, the digital signal corresponding to the inter-terminal voltage of the shunt resistor 4. The digital signal output from the first A/D converter 11 in this way is a signal corresponding to the signal of the terminal of the shunt resistor 4.

The first synchronous detection circuit 12 receives an input of a digital signal output from the first A/D converter 11 and synchronously detects the signal at the same frequency as the AC signal in the signal application unit 6, and extracts the signal. Then, the first synchronous detection circuit 12 outputs the extracted signal to the control unit 9. The output signal of the first synchronous detection circuit 12 is a signal corresponding to the terminal voltage of the shunt resistor 4. In this way, during the correction period, the first voltage detection unit 7 is configured to detect the terminal voltage of the shunt resistor 4 based on the output signal of the first synchronous detection circuit 12, and outputs the signal representing the detection value of the terminal voltage as the first voltage detection value to the control unit 9.

The first voltage detection unit 7 detects the terminal voltage of the shunt resistor 4 as follows when the AC signal is not applied to the series circuit of the shunt resistor 4 and the correction resistor 5, that is, in the normal state. That is, in the normal state, the first A/D converter 11 performs the A/D conversion operation in the same manner as in the correction time. In this case, the digital signal output from the first A/D converter 11 is output to the control unit 9 without being input to the first synchronous detection circuit 12. That is, in the normal state, the first voltage detection unit 7 detects the terminal voltage of the shunt resistor 4 based on the output signal of the first A/D converter 11, and outputs a signal representing the detection value of the terminal voltage as the first voltage detection value to the control unit 9.

The second voltage detection unit 8 detects the terminal voltage of the correction resistor 5 when an AC signal is applied to the series circuit of the shunt resistor 4 and the correction resistor 5, and includes a second A/D converter 13 and a second synchronous detection circuit 14. The second A/D converter 13 performs an A/D conversion operation as follows in order to detect the terminal voltage of the correction resistor 5. That is, the second A/D converter 13 inputs the signal of each terminal of the correction resistor 5, and by performing A/D conversion of each signal, outputs the difference in the voltage of each terminal of the correction resistor 5, that is, a digital signal corresponding to the inter-terminal voltage of the correction resistor 5. The digital signal output from the second A/D converter 13 in this way is a signal corresponding to the signal of the terminal of the correction resistor 5.

The second synchronous detection circuit 14 receives an input of a digital signal output from the second A/D converter 13 and synchronously detects the signal at the same frequency as the AC signal in the signal application unit 6, and extracts the signal. Then, the second synchronous detection circuit 14 outputs the extracted signal to the control unit 9. The output signal of the second synchronous detection circuit 14 is a signal corresponding to the terminal voltage of the correction resistor 5. In this way, during the correction period, the second voltage detection unit 8 is configured to detect the terminal voltage of the correction resistor 5 based on the output signal of the second synchronous detection circuit 14, and outputs the signal representing the detection value of the terminal voltage as the second voltage detection value to the control unit 9.

The control unit 9 is configured as a semiconductor integrated circuit such as the same ASIC together with the first voltage detection unit 7 and the second voltage detection unit 8. ASIC is an abbreviation for Application Specific Integrated Circuit. The control unit 9 includes functional blocks such as a current detection unit 15, a correction unit 16 and a relay control unit 17. Each of these functional blocks is realized by hardware.

The control unit 9 can be configured as a semiconductor integrated circuit different from the first voltage detection unit 7 and the second voltage detection unit 8. For example, the control unit 9 may be configured by a microcomputer including a CPU, a RAM, a ROM, and the like. In this case, each of the above-mentioned functional blocks is realized by the CPU of the control unit 9 executing a computer program stored in a ROM or the like to provide a process corresponding to the computer program, that is, realized by software. Alternatively, in this case, at least a part of the functional blocks may be implemented in hardware manner.

The current detection unit 15 detects a detection target current using a signal corresponding to the terminal voltage of the shunt resistor 4 output from the first voltage detection unit 7 at the normal time and a resistance value for detection corresponding to the resistance value of the shunt resistor 4. The resistance value for detection is set based on the initial resistance value of the shunt resistor 4 actually used, and is stored in advance in the memory provided in the control unit 9. Here, since the detection target current, which is a relatively large current, flows in the shunt resistor 4, the resistance value changes from the initial value due to deterioration over time or the like. The resistance value for detection or current detection corresponding to the resistance value of the shunt resistor 4 described in the present disclosure may be simply referred to as a detection resistance value.

Therefore, the above-mentioned resistance value for detection is corrected at any time by the operation of the correction unit 16. At the time of correction, the correction unit 16 calculates the resistance value of the shunt resistor 4 based on the corrected resistance value corresponding to the resistance value of the correction resistor 5, the signal representing a first voltage detection value output from the first voltage detection unit 7, and the signal representing a second voltage detection value output from the second voltage detection unit 8. The correction unit 16 corrects the resistance value for detection based on the calculated resistance value which is the calculated resistance value of the shunt resistor 4. For example, the correction unit 16 can correct the resistance value for detection so as to match the calculated resistance value.

The above-mentioned correction resistance value is an initial resistance value of the correction resistor 5 actually used, and is stored in advance in the memory provided in the control unit 9. Since the detection target current does not flow in the correction resistor 5 in the normal state, the resistance value hardly changes from the initial value due to aged deterioration or the like. As described above, in the above configuration, a resistance value correction circuit 18 for correcting the resistance value for detection is configured by the correction resistor 5, the signal application unit 6, the first voltage detection unit 7, the second voltage detection unit 8, and the correction unit 16.

The relay control unit 17 controls the relays RL1, RL2 to be turned on or off. The relay control unit 17 also turns on the relay RL2 while turning on the relay RL1, and also turns off the relay RL2 while turning off the relay RL1. That is, the relay control unit 17 similarly controls the on/off state of the two relays RL1 and RL2. According to such a configuration, even though one of the two relays RL1 and RL2 is fixed to the on state, it is possible to enhance the safety of the vehicle since it is possible to block the electrical conduction to, for example, the load 3 by turning off the other one of the relays RL1, RL2. In the present embodiment, two relays RL1, RL2 are provided for enhancing the safety. However, one relay may be provided so as to be interposed in series with the path through which the detection target current flows.

The relay control unit 17 turns on both of the relays RL1, RL2 during normal operation, and turns off both the relays RL1, RL2 during correction. The current detection unit 15 detects the detection target current while the relays RL1, RL2 are being turned on by the relay control unit 17. The resistance value correction circuit 18 calculates the resistance value of the shunt resistor 4 while the relays RL1, RL2 are being turned off by the relay control unit 17.

(Specific Configuration of Signal Application Unit)

Figure 2:
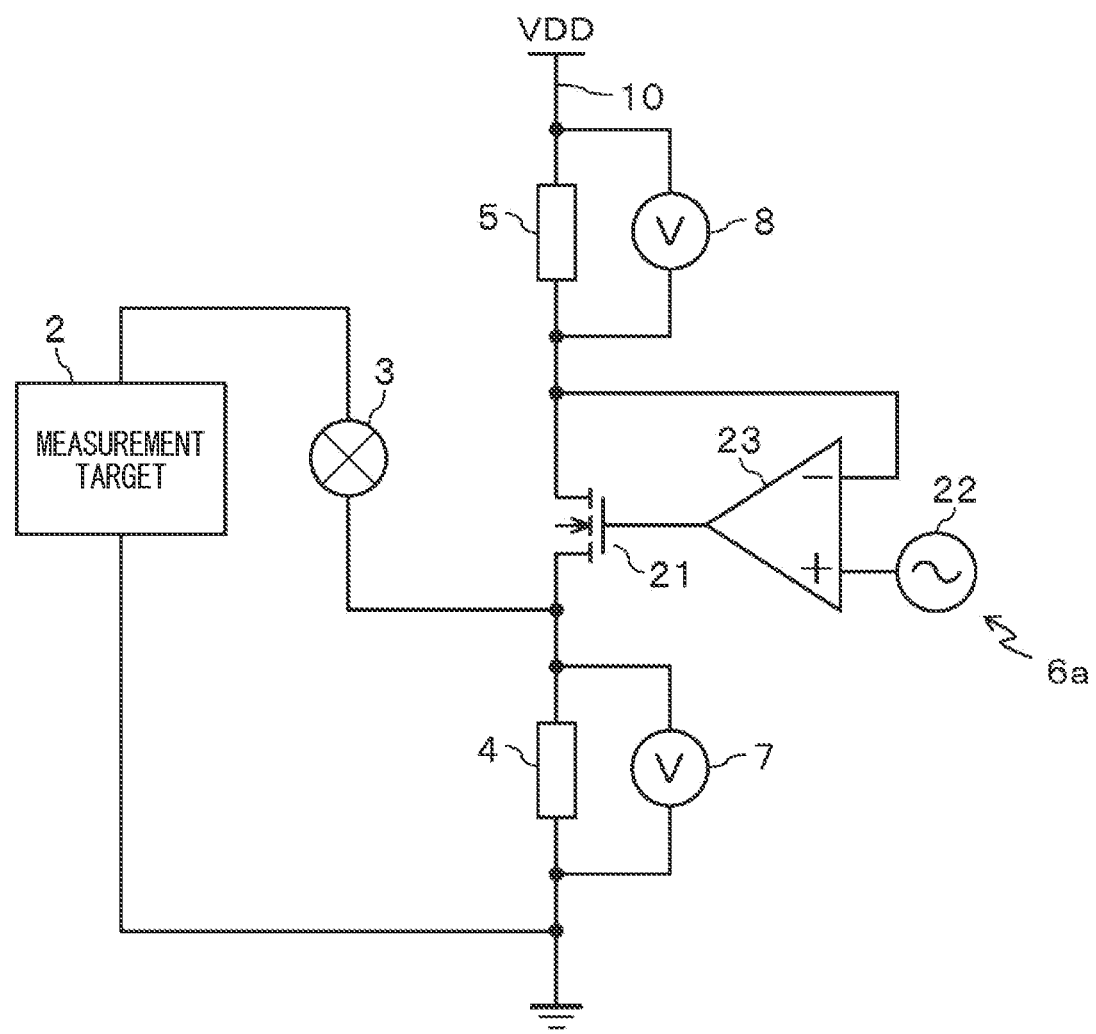
FIG. 2 is a diagram showing a specific first configuration example of the signal application unit according to the first embodiment.
Figure 3:
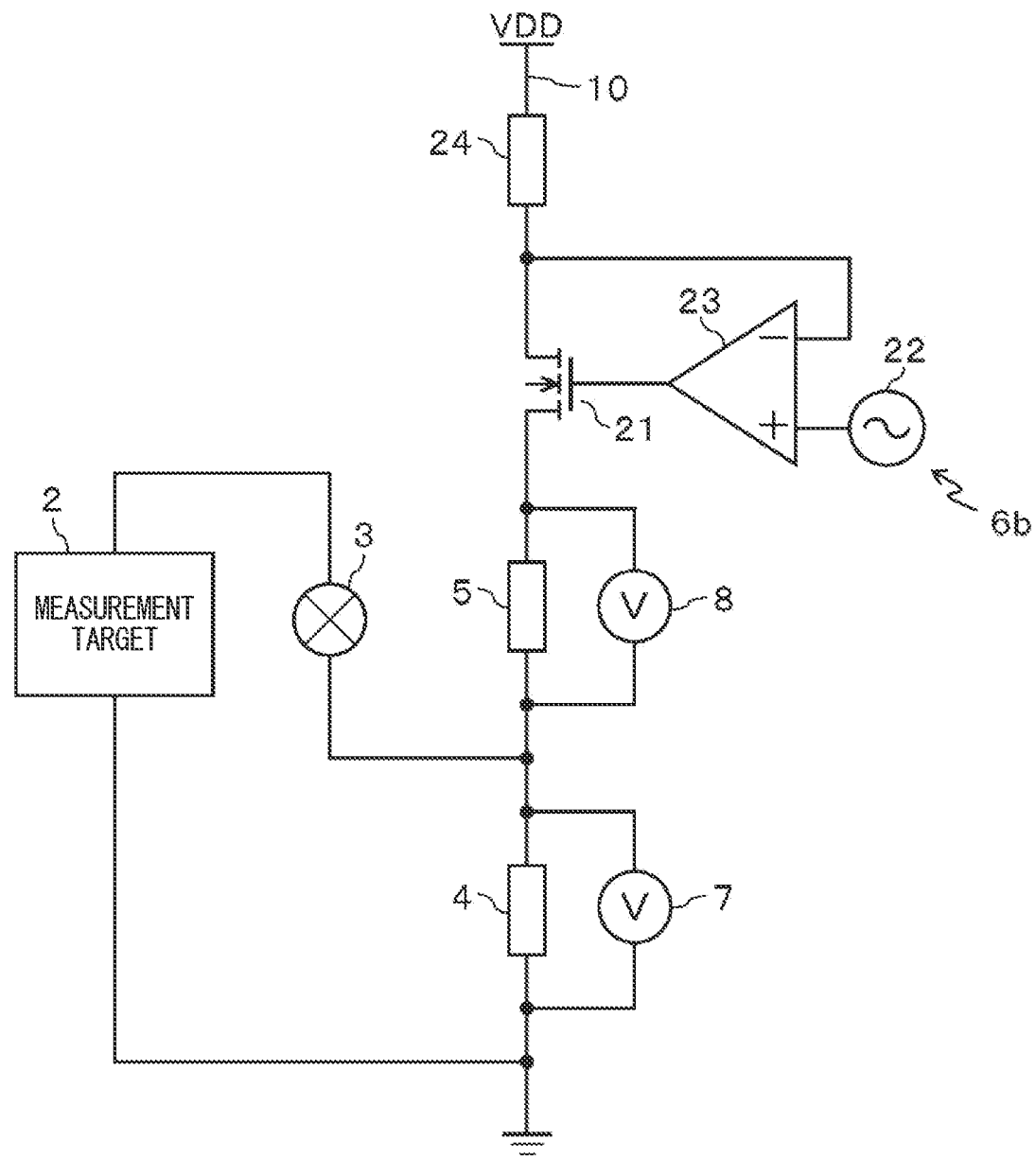
FIG. 3 is a diagram showing a specific second configuration example of the signal application unit according to the first embodiment.
Figure 4:
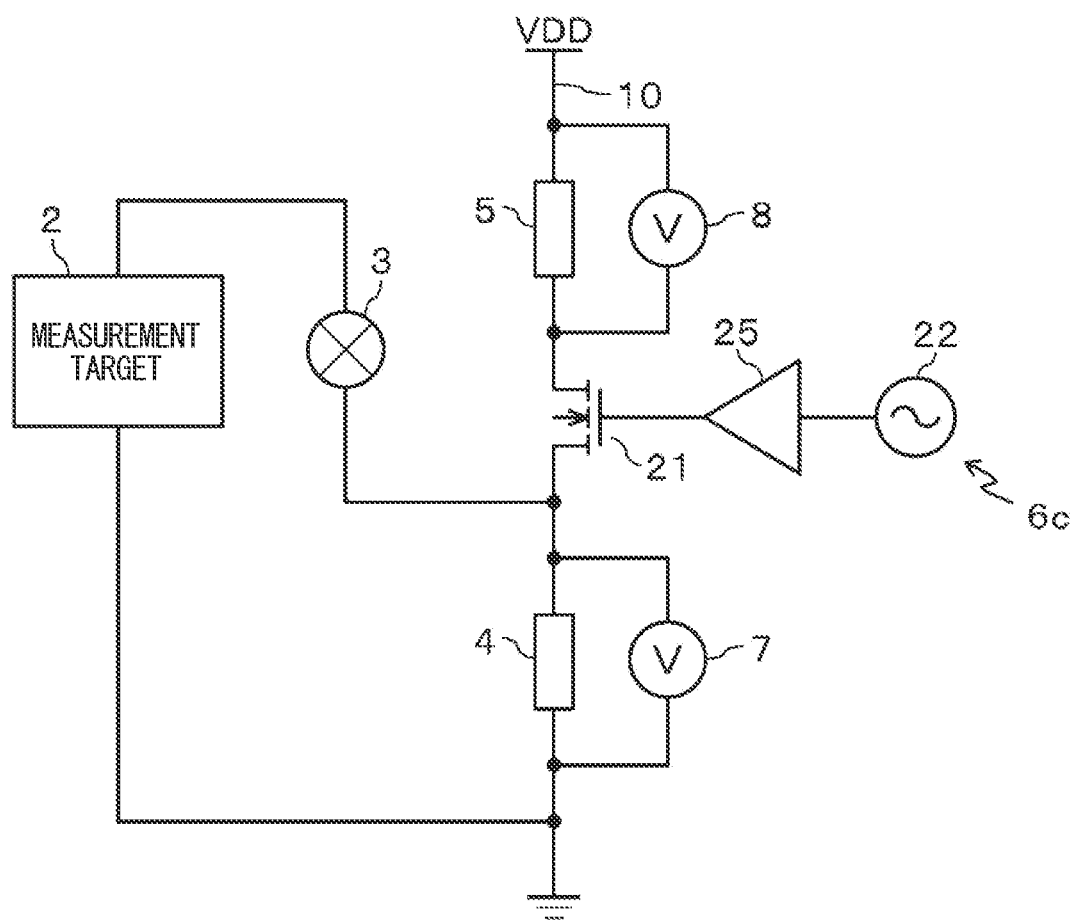
FIG. 4 is a diagram showing a specific third configuration example of the signal application unit according to the first embodiment.
Figure 5:
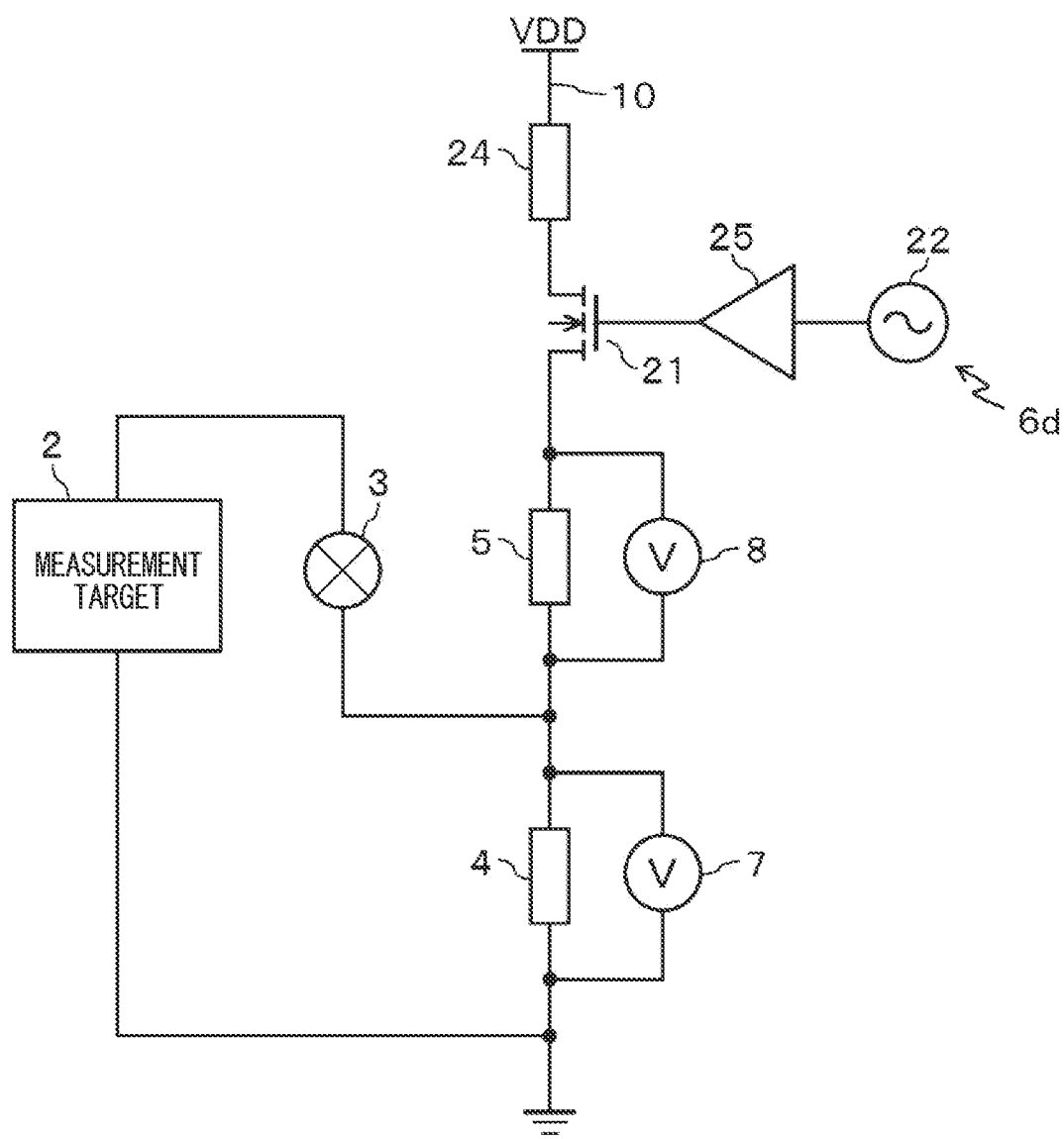
FIG. 5 is a diagram showing a specific fourth configuration example of the signal application unit according to the first embodiment.

Specific configurations of the signal application unit 6 include, for example, a first configuration example shown in FIG. 2, a second configuration example shown in FIG. 3, a third configuration example shown in FIG. 4, a fourth configuration example shown in FIG. 5, and the like.

First Configuration Example

As shown in FIG. 2, the signal application unit 6a of the first configuration example includes, for example, a transistor 21, a signal generation unit 22, and an operational (OP) amplifier 23. The transistor 21 is, for example, an N-channel MOSFET whose drain is connected to the power supply line 10 via a correction resistor 5 and source is connected to ground via a shunt resistor 4. The signal generation unit 22 generates and outputs a pulse wave signal or a sine wave signal having the same frequency as the alternating current applied to the series circuit of the shunt resistor 4 and the correction resistor 5.

The output signal of the signal generation unit 22 is provided to the non-inverting input terminal of the OP amplifier 23. The inverting input terminal of the OP amplifier 23 is connected to the drain of the transistor 21, and the output terminal of the OP amplifier 23 is connected to the gate of the transistor 21. According to the above configuration, the transistor 21 is driven by the OP amplifier 23, so that an AC signal, which is an alternating current, is applied to the series circuit of the shunt resistor 4 and the correction resistor 5. As described above, the signal application unit 6a of the first configuration example is configured to be driven by an amplifier. In this case, the correction resistor 5 also functions as a current source for the signal application unit 6a.

Second Configuration Example

As shown in FIG. 3, the signal application unit 6b of the second configuration example is different from the signal application unit 6a of the first configuration example shown in FIG. 2 in that a resistor 24 is added. In this case, the drain of the transistor 21 is connected to the power supply line 10 via the resistor 24, and the source of the transistor 21 is connected to the ground via the correction resistor 5 and the shunt resistor 4.

Even with the above configuration, as in the first configuration example, the transistor 21 is driven by the OP amplifier 23, so that an AC signal, which is an alternating current, is applied to the series circuit of the shunt resistor 4 and the correction resistor 5. As described above, the signal application unit 6b of the second configuration example has an amplifier drive configuration like the signal application unit 6a of the first configuration example. In this case, the resistor 24 and the transistor 21 provided separately from the correction resistor 5 function as a current source of the signal application unit 6b.

Third Configuration Example

As shown in FIG. 4, the signal application unit 6c of the third configuration example is different from the signal application unit 6a of the first configuration example shown in FIG. 2 in that a buffer 25 instead of the OP amplifier 23 is arranged. In this case, the output signal of the signal generation unit 22 is given to the input terminal of the buffer 25. The output terminal of the buffer 25 is connected to the gate of the transistor 21. According to the above configuration, the transistor 21 is driven by the buffer 25, so that an AC signal, which is an alternating current, is applied to the series circuit of the shunt resistor 4 and the correction resistor 5. As described above, the signal application unit 6c of the third configuration example has a buffer drive configuration.

Fourth Configuration Example

As shown in FIG. 5, the signal application unit 6d of the fourth configuration example is different from the signal application unit 6b of the second configuration example shown in FIG. 3 in that the buffer 25 instead of the OP amplifier 23 is arranged. In this case, the output signal of the signal generation unit 22 is given to the input terminal of the buffer 25. The output terminal of the buffer 25 is connected to the gate of the transistor 21. According to the above configuration, the transistor 21 is driven by the buffer 25, so that an AC signal, which is an alternating current, is applied to the series circuit of the shunt resistor 4 and the correction resistor 5. As described above, the signal application unit 6d of the fourth configuration example has a buffer drive configuration.

(Feature of Each Configuration Example)

In the first configuration example and the third configuration example, since the correction resistor 5 is arranged closer to the power supply line 10, and the shunt resistor 4 is arranged closer to the ground, the first voltage detection unit 7 and the second voltage detection unit 8 detect voltages at potentials that are significantly different from each other. Therefore, according to the first configuration example and the third configuration example, although the detection errors of the terminal voltages of the shunt resistor 4 and the correction resistor 5 may be likely to occur with respect to the second configuration example and the fourth configuration example, the correction resistor 5 provides current sources for the application units 6a and 6c in common so that the number of elements can be suppressed to a small number as an advantage.

In the second configuration example and the fourth configuration example, since it is necessary to provide the resistor 24 different from the correction resistor 5 in order to configure the current source of the signal application units 6b and 6d, as a drawback, the number of elements increases compared with the first configuration example and the third configuration example. However, in the second configuration example and the fourth configuration example, since both the correction resistor 5 and the shunt resistor 4 are arranged closer to the ground, the first voltage detection unit 7 and the second voltage detection unit 8 detect voltages at potentials similar to each other. Therefore, according to the second configuration example and the fourth configuration example, there is an advantage that the detection errors of the terminal voltages of the shunt resistor 4 and the correction resistor 5 can be suppressed to be smaller than those of the first configuration example and the third configuration example.

According to the first configuration example and the second configuration example of the amplifier drive configuration, the drain voltage of the transistor 21 is controlled to be constant by the operation of the OP amplifier 23, so that the first configuration example and the second configuration example have a merit, compared with the third configuration example and the fourth configuration example of the buffer drive configuration, such that the accuracy of the AC current applied to the series circuit of the shunt resistor 4 and the correction resistor 5 can be improved. On the other hand, according to the third configuration example and the fourth configuration example, there is an advantage that the circuitry scale can be suppressed to a smaller size by using the buffer 25 instead of the OP amplifier 23 as compared with the first configuration example and the second configuration example.

(Specific Configuration of Each Synchronous Detection Circuit)

Figure 6:
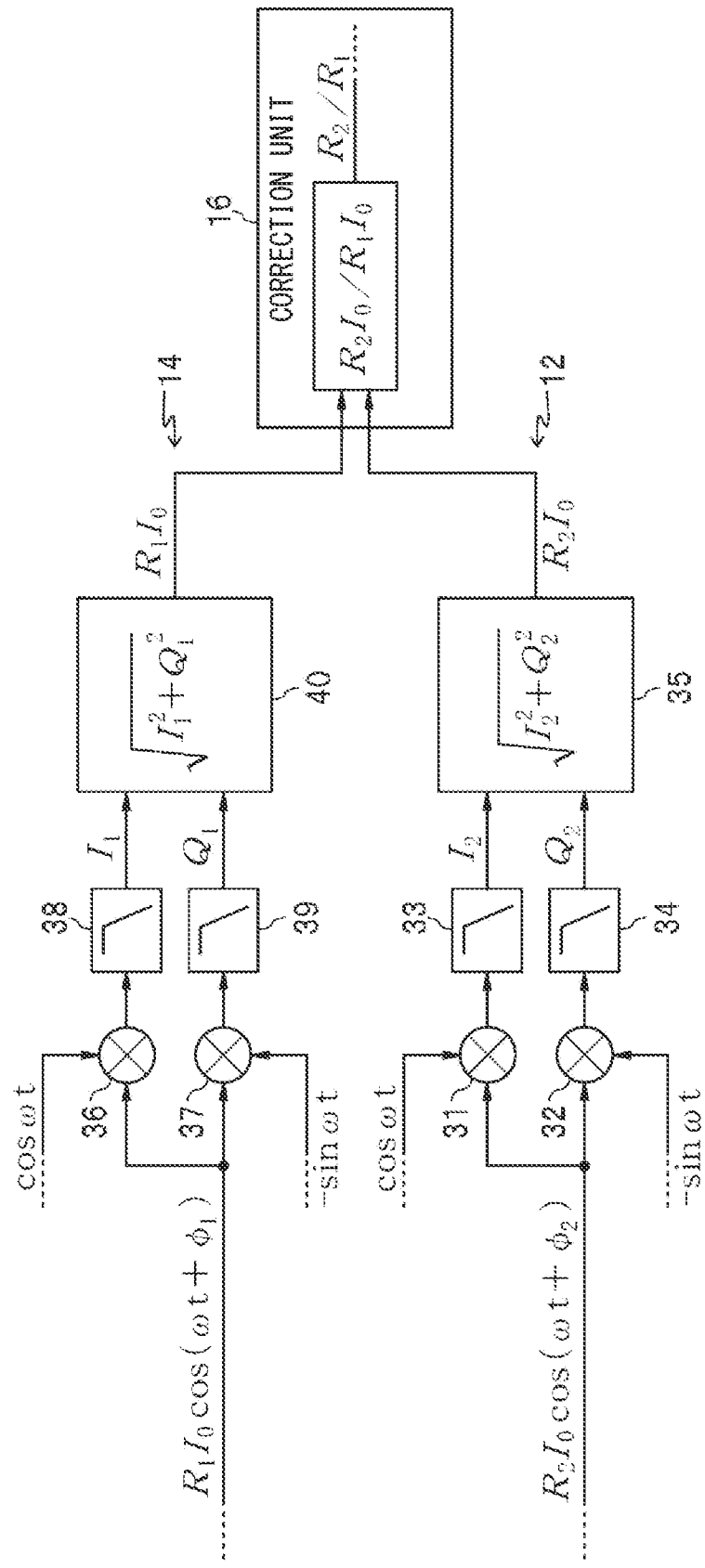
FIG. 6 is a specific configuration example of each synchronous detection circuit according to the first embodiment.

A specific configuration of the first synchronous detection circuit 12 and the second synchronous detection circuit 14 includes, for example, the configuration shown in FIG. 6. In this case, the alternating current signal, which is the AC current applied to the series circuit of the shunt resistor 4 and the correction resistor 5 by the signal application unit 6, is defined as "$Io \cdot \cos(\omega t)$", and the resistance value of the shunt resistor 4 is defined as R2, and the resistance value of the correction resistor 5 is defined as R1. Here, $\omega$ is an angular frequency and t is a time.

As shown in FIG. 6, the first synchronous detection circuit 12 includes multipliers 31 and 32, low-pass filters 33 and 34, and an arithmetic unit 35. In this specification, the low-pass filter may be abbreviated as LPF. During the time of correction when the AC signal is applied to the series circuit of the shunt resistor 4 and the correction resistor 5, the digital signal output from the first A/D converter 11 is provided to each one input terminal of the multipliers 31 and 32 of the first synchronous detection circuit 12. This digital signal is a signal corresponding to the terminal voltage of the shunt resistor 4 in the time of correction, and is defined as "$R2 \times Io \times \cos(\omega t + \varphi 2)$".

A cosine wave signal of "$\cos(\omega t)$" is provided to the other input terminal of the multiplier 31. A sine wave signal of "$-\sin(\omega t)$" is provided to the other input terminal of the multiplier 32. As a result, in each output signal of the multipliers 31 and 32, the signal having the angular frequency $\omega$ is extracted as a direct current component. The output signals of the multipliers 31 and 32 are provided to low-pass filters (LPFs) 33 and 34, respectively.

The output signal 12 of the LPF 33 is a low frequency signal proportional to the in-phase component of the input signal, and the output signal Q2 of the LPF 34 is a low frequency signal proportional to the orthogonal phase component of the input signal. The arithmetic unit 35 calculates the square root of the sum of squares of the signal 12 and the signal Q2, and outputs a signal representing the calculation result. The output signal of the arithmetic unit 35 is expressed as "$R2 \times Io$". The output signal of the arithmetic unit 35 becomes an output signal of the first synchronous detection circuit 12, and is provided to the correction unit 16 of the control unit 9.

The second synchronous detection circuit 14 includes multipliers 36 and 37, low-pass filters 38 and 39, and an arithmetic unit 40. During the time of correction when the AC signal is applied to the series circuit of the shunt resistor 4 and the correction resistor 5, the digital signal output from the second A/D converter 13 is provided to each one input terminal of the multipliers 36 and 37 of the second synchronous detection circuit 14. This digital signal is a signal corresponding to the terminal voltage of the correction resistor 5 in the time of correction, and is defined as "R1×lo×cos(ωt+φ1)".

A cosine wave signal of "cos(ωt)" is provided to the other input terminal of the multiplier 36. A sine wave signal of "−sin(ωt)" is provided to the other input terminal of the multiplier 37. As a result, in each output signal of the multipliers 36 and 37, the signal having the angular frequency ω is extracted as a direct current component. The output signals of the multipliers 36 and 37 are provided to the LPFs 38 and 39, respectively.

The output signal 11 of the LPF 38 is a low frequency signal proportional to the in-phase component of the input signal, and the output signal Q1 of the LPF 39 is a low frequency signal proportional to the orthogonal phase component of the input signal. The arithmetic unit 40 calculates the square root of the sum of squares of the signal 11 and the signal Q1, and outputs a signal representing the calculation result. The output signal of the arithmetic unit 40 is expressed as "R1×lo". The output signal of the arithmetic unit 40 becomes an output signal of the second synchronous detection circuit 14, and is provided to the correction unit 16 of the control unit 9.

The correction unit 16 obtains the value "R2/R1" by dividing the output signal "R2/lo" of the first synchronous detection circuit 12 by the output signal "R1/lo" of the second synchronous detection circuit 14. Here, the resistance value R1 of the correction resistor 5 is a known value and is stored in advance in the memory of the control unit 9 or the like. Therefore, the correction unit 16 multiplies the value "R2/R1" obtained as described above by the resistance value R1 stored in advance, so that the resistance value R2 of the shunt resistor 4 at the present time, that is, the calculation resistance value can be calculated.

According to the present embodiment described above, the following effects are obtained. In the current sensor 1 according to the present embodiment, the current flowing to the measurement target 2, in other words, the current equivalent to the detection target current flows through the shunt resistor 4 while the relays RL1, RL2 are being turned on. Therefore, the current detection unit 15 detects the detection target current while the relays RL1, RL2 are being turned on by the relay control unit 17. The current detection unit 15 can detect the detection target current based on the voltage across the terminals of the shunt resistor 4, in other words, a voltage drop across the shunt resistor 4.

In the current sensor 1 according to the present embodiment, the detection target current does not flow to the measurement target 2 while the relays RL1, RL2 are turned off. The resistance value correction circuit 18 calculates the resistance value of the shunt resistor 4 while the relays RL1, RL2 are turned off by the relay control unit 17. The resistance value correction circuit 18 can execute the measurement for calculating the resistance value of the shunt resistor 4 in a state where the detection target current does not flow. The resistance value correction circuit 18 can execute the measurement without being affected by a variety of noises generated by the flow of the detection target current. As a result, it is possible to detect the correction of the resistance value for current detection with enhanced accuracy.

In a structure where, for example, the measurement target for current detection is connected to the shunt resistor in parallel, a measurement error may occur due to the impedance of the measurement target. On the other hand, in the current sensor 1 according to the present embodiment, the resistance value correction circuit 18 executes the measurement for calculating the resistance value of the shunt resistor 4, while the relays RL1, RL2 are turned off by the relay control unit 17. In other words, the resistance value correction circuit 18 executes the measurement for calculating the resistance value of the shunt resistor 4, in a state where the measurement target 2 and the load 3 are not connected in parallel between both terminals of the shunt resistor 4. According to the present embodiment, the measurement can be executed without being affected by the impedance such as the measurement target 2 and the load 3, so that it is possible to further lower the measurement error. As a result, it is possible to execute the correction of the resistance value for current detection with enhanced accuracy.

In the current sensor 1 according to the present embodiment, the resistance value correction circuit 18 for correcting the resistance value for current detection includes the correction resistor 5, the signal application unit 6, the first voltage detection unit 7, the second voltage detection unit 8, and the correction unit 16. The correction resistor 5 is connected in series together with the shunt resistor 4 in a path different from the path through which the detection target current flows, and the resistance accuracy of the correction resistor 5 is higher than that of the shunt resistor 4. The signal application unit 6 applies an AC signal to the series circuit of the shunt resistor 4 and the correction resistor 5.

The first voltage detection unit 7 detects the terminal voltage of the shunt resistor 4 when the AC signal is applied to the series circuit. The second voltage detection unit 8 detects the terminal voltage of the correction resistor 5 when the AC signal is applied to the series circuit. The correction unit 16 calculates the resistance value of the shunt resistor 4 based on the first voltage detection value which is the terminal voltage detection value by the first voltage detection unit 7 and the second voltage detection value which is the terminal voltage detection value by the second voltage detection unit 8, and corrects the detection resistance value based on the calculated resistance value which is the calculated resistance value of the shunt resistor 4.

According to such a configuration, it is possible to directly correct the resistance value for detection by using the shunt resistor 4 without indirectly correcting the resistance value for detection by using the sub-resistors as in the first conceivable technique. Further, according to the above configuration, unlike the second conceivable technique, it is not necessary to provide a plurality of shunt resistors nor to provide an input terminal at the center of the shunt resistors, and only one shunt resistor 4 is required, so that the configuration of the entire current sensor 1 is not complicated.

Further, according to the above configuration, the calculation accuracy of the calculated resistance value and the correction accuracy of the detection resistance value greatly depend on the accuracy of the resistance value of the correction resistor 5 and the detection accuracy of the first voltage detection value and the second voltage detection value. In this case, since the correction resistor 5 has a higher resistance accuracy than the shunt resistor 4, the correction accuracy of the detection resistance value is sufficiently improved. Therefore, according to the above embodiment, it is possible to obtain an excellent effect that the resistance value for detection can be corrected with high accuracy without complicating the configuration of the entire current sensor 1.

In this case, the first voltage detection unit 7 includes the first synchronous detection circuit 12 that receives an input of the signal of the terminal of the shunt resistor 4 and synchronously detects the signal at the same frequency as the AC signal to extract and output the signal, and the first voltage detection unit 7 is configured to detect the terminal voltage of the shunt resistor 4 based on the output signal of the first synchronous detection circuit 12. Further, in this case, the second voltage detection unit 8 includes the second synchronous detection circuit 14 that receives an input of the signal of the terminal of the correction resistor 5 and synchronously detects the signal at the same frequency as the AC signal, extracts and outputs the signal, and the second voltage detection unit 8 is configured to detect the terminal voltage of the correction resistor 5 based on the output signal of the second synchronous detection circuit 14.

According to such a configuration, the terminal voltages of the shunt resistor 4 and the correction resistor 5 are detected based on the signal extracted by synchronous detection at the same frequency as the frequency of the AC signal applied to the shunt resistor 4 and the correction resistor 5. Therefore, according to the present embodiment, the detection accuracy of the detection value of each of the first voltage detection value and the second voltage detection value is restricted from being reduced due to the influence of noise such as thermoelectromotive force and an offset on the circuit side, and as a result, the accuracy of correction of the resistance value for detection can be further improved.

The signal application unit 6 applies a pulse wave or sinusoidal AC signal to the series circuit of the shunt resistor 4 and the correction resistor 5. When the signal application unit 6 applies a sine wave AC signal, the configuration for generating the AC signal, specifically, the configuration of the signal generation unit 22 is complicated, but the signal includes only a frequency component desired as an AC signal. Thus, the detection error of the first voltage detection value and the second voltage detection value can be suppressed to a low level, in other words, the accuracy of correction of the resistance value for detection can be improved. On the other hand, when the signal application unit 6 applies a pulse wave AC signal, an error may occur in the detection value of each of the first voltage detection value and the second voltage detection value because the AC signal includes a harmonic component. However, the configuration for generating an AC signal, specifically, the configuration of the signal generation unit 22 can be simplified.

Next, modifications of the present embodiment are described.

(Modified Example of Arrangement of Shunt Resistor)

In the present embodiment, the shunt resistor 4 is provided on the low side of the measurement target 2. However, the shunt resistor 4 may be provided in series with the path through which the detection target current flows. In other words, the arrangement may be properly modified. For example, the configuration according to a modified example as shown in FIG. 7 may be adopted for an alternative arrangement of the shunt resistor 4.

Figure 7:
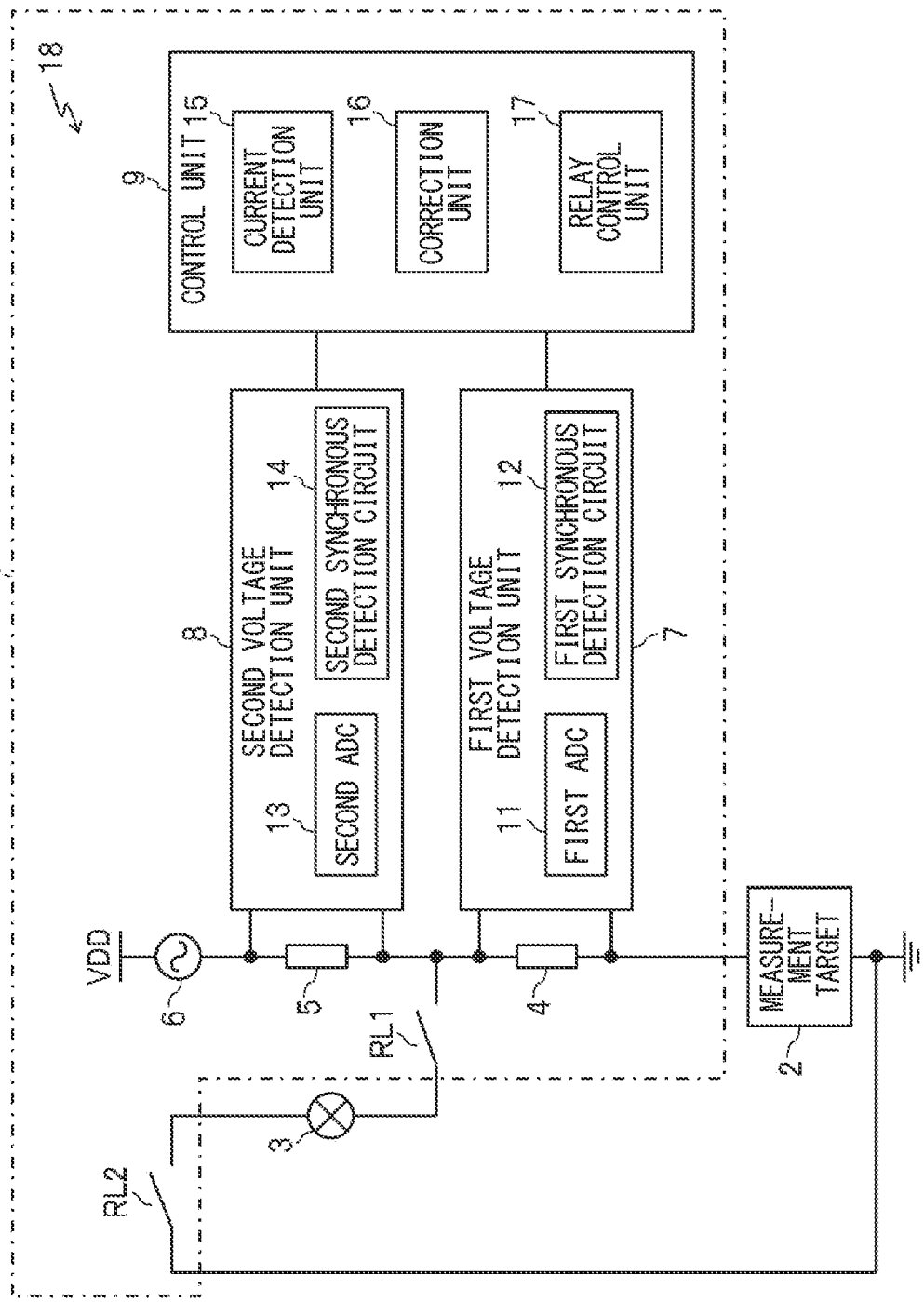
FIG. 7 is a diagram schematically showing a configuration of a current sensor according to modification of the first embodiment.

As shown in FIG. 7, in a current sensor 41 adopting the above configuration, one of the terminals of the shunt resistor 4 is connected to one of the terminals of the load 3 via the relay RL1, and the other one of the terminals of the shunt resistor 4 is connected to the high-potential side of the measurement target 2. In this case, the low-potential side terminal of the measurement target 2 is connected to the ground which is the reference potential of the circuit, and is connected to the other one of the terminals of the load 3 via the relay RL2. In this case, the shunt resistor 4 is provided on the high-potential side of the measurement target 2. Even with this modification, the advantageous effect identical to the one in the present embodiment described above can be obtained.

(Modified Example of Calculation of Resistance Value of Shunt Resistor)

Although the resistance value correction circuit 18 calculates the resistance value of the shunt resistor 4 while the relay RL1, RL2 is turned off by the relay control unit 17, the resistance value correction circuit 18 can also calculate the resistance value of the shunt resistor 4 while the relays RL1, RL2 are being turned on by the relay control unit 17. The following modified example may be adopted. In the present modified example, the current detection unit 15 detects the detection target current and the resistance value correction circuit 18 calculates the resistance value of the shunt resistor 4, while the relays RL1, RL2 are being turned on by the relay control unit 17. In addition, in the present modified example, the resistance value correction circuit 18 calculates the resistance value of the shunt resistor 4, while the relays RL1, RL2 are turned off by the relay control unit 17.

According to the above modified example, the resistance value of the shunt resistor 4 can be calculated, while the relays RL1, RL2 are being turned on. As described in the following, the calculation result of the resistance value of the shunt resistor 4 in a period during which the relays RL1, RL2 are being turned on can be adopted. The accuracy of the calculation of the resistance value in a period during which the relays RL1, RL2 are being turned on is lower than the accuracy of the calculation of the resistance in a period during which the relays RL1, RL2 is turned off due to the flow of the detection target current to the measurement target 2.

Therefore, the calculation result of the above resistance value is not suitable for use in the correction of the resistance value for current detection. However, it is possible to determine whether or not the resistance value of the shunt resistor 4 has changed significantly from the calculation result of the above resistance value. According to the present modified example, it is possible to determine whether or not a fault such as disconnection has occurred in, for example, the shunt resistor 4 by adopting the calculation result of the above resistance value. According to the present modified example, in a period during which the relays RL1, RL2 are being turned on, it is possible to diagnose a fault of, for example, the shunt resistor 4 to enhance the safety of a vehicle so that functional safety can be achieved.

Second Embodiment

Figure 8:
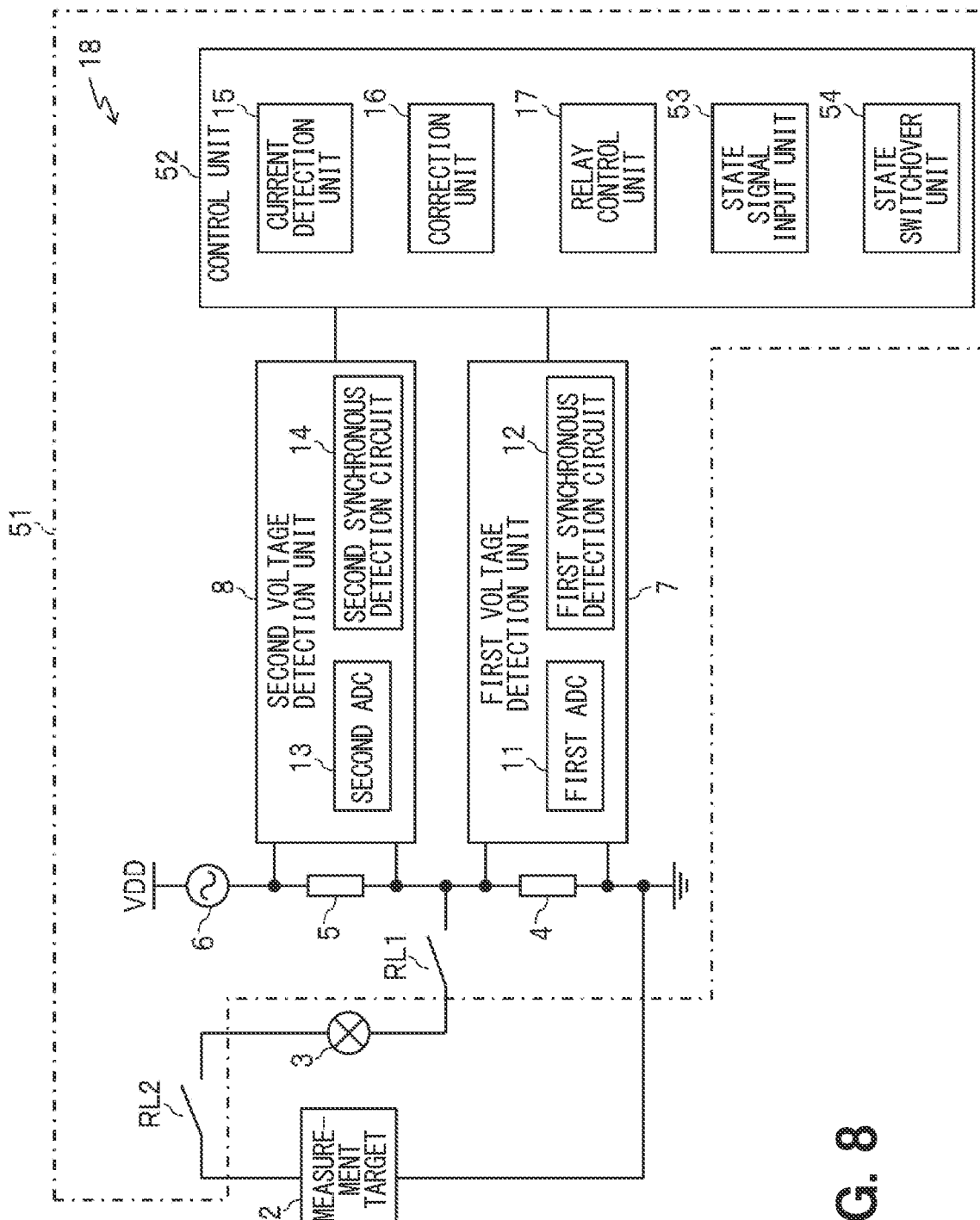
FIG. 8 is a diagram schematically showing a configuration of a current sensor according to a second embodiment.

The following describes a second embodiment with reference to FIGS. 8, 9. As shown in FIG. 8, a current sensor 51 according to the present embodiment is different from the current sensor 1 according to the first embodiment shown in FIG. 1 in that a control unit 52 instead of the control unit 9 is provided. The control unit 52 includes two functional blocks being a state signal input unit 53 and a state switchover unit 54 in addition to each functional block included in the control unit 9.

The state signal input unit 53 receives an input of a state signal Sa provided from outside of the current sensor 51. The state signal Sa is a signal representing the state of a motor and a power converter assumed as the measurement target 2 and the load 3. In other words, the state signal Sa represents the state of the motor adapted to the vehicle and the power converter for supplying power to the motor. The state switchover unit 54 switches the state of the current sensor 51 to any one of a first state, a second state and a third state, based on the state signal Sa received through the state signal input unit 53.

The first state is a state in which the current detection unit 15 detects the detection target current while the relays RL1, RL2 are being turned on by the relay control unit 17. The second state is a state in which the current detection unit 15 detects the detection target current and the resistance value correction circuit 18 calculates the resistance value of the shunt resistor 4, while the relays RL1, RL2 are being turned on by the relay control unit 17. The third state is a state in which the resistance value correction circuit 18 calculates the resistance value of the shunt resistor 4, while the relays RL1, RL2 are being turned off by the relay control unit 17. In the third state, the resistance value correction circuit 18 also corrects the resistance value for current detection.

As a specific switchover pattern of the states of the state switchover unit 54, for example, three patterns can be adopted as shown in FIG. 9.

(First Pattern)

In a first pattern P1, the state switchover unit 54 switches the state of the current sensor 51 to the first state, in a case where the state signal Sa indicates that the motor and the power converter are being driven. The state in which the motor and the power converter are being driven corresponds to a state in which the vehicle is driven by a vehicle driver and the vehicle is travelling. The term "travelling" may also be referred to as "running". Therefore, in FIG. 9 and the following description, such a state may be referred to as "driving and travelling".

In the first pattern P1, the state switchover unit 54 switches the state of the current sensor 51 to the third state, in a case where the state signal Sa indicates that the power supply to the motor and the power converter has been stopped. The state in which the power supply to the motor and the power converter has been stopped corresponds to a state in which the vehicle is not been operated by the vehicle driver and the power supply for a structure related to the travelling of the vehicle is turned off. Therefore, in FIG. 9 and the following description, such a state may be referred to as "during power-off". In the first pattern P1, the state switchover unit 54 does not switch the state of the current sensor 51 to the second state.

(Second Pattern)

In a second pattern P2, the state switchover unit 54 switches the state of the current sensor 51 to the second state, in a case where the state signal Sa indicates that the motor and the power converter are being driven. In the second pattern P2, the state switchover unit 54 switches the state of the current sensor 51 to the second state, in a case where the state signal Sa indicates that the power supplying to the motor and the power converter has been stopped.

(Third Pattern)

In a third pattern P3, the state switchover unit 54 switches the state of the current sensor 51 to the first state, in a case where the state signal Sa indicates that the motor and the power converter are being driven. In the third pattern P3, the state switchover unit 54 switches the state of the current sensor 51 to the second state, in a case where the state signal Sa indicates that the drive of the motor has been stopped and the power converter is being driven.

The state in which the drive of the motor has been stopped and the power converter is being driven corresponds to a state in which the vehicle is being operated by the vehicle driver and the vehicle is pausing. In FIG. 9, such a state is expressed as "driving and pausing". In the third pattern P3, the state switchover unit 54 switches the state of the current sensor 51 to the third state, in a case where the state signal Sa indicates that the power supply to the motor and the power converter has been stopped.

As described above, the current sensor 51 according to the present embodiment can switch the state of the current sensor 51 to any one of the first state, the second state and the third state based on the state signal Sa. The state signal Sa indicates the state of the motor and the power converter adapted to the vehicle. In the first state, the detection target current is detected while the condition that the relays RL1, RL2 are being turned on. In the second state, the detection target current is detected and the resistance value of the shunt resistor 4 is calculated while the relays RL1, RL2 are being turned on. In the third state, the resistance value of the shunt resistor 4 is calculated, while the relays RL1, RL2 are being turned off.

According to such a configuration, based on the state of the vehicle at that time, in particular, based on a condition whether the vehicle is being driven and travelling, whether the vehicle is being driven and pausing, or whether the power supply for the vehicle is being turned off, it is possible to appropriately switch the state of the current sensor to any one of the first state, the second state and the third state. In the first state, the detection target current is detected. In the second state, the detection target current is detected and the resistance value of the shunt resistor 4 is calculated with a relatively low accuracy. In the third state, the resistance value of the shunt resistor 4 is calculated with a relatively high accuracy.

The state switchover unit 54 can execute the switchover of the above-mentioned states according to the above-mentioned the first pattern P1, the second pattern P2, and the third pattern P3. According to the first pattern P1, it is possible to stop the operation of the resistance value correction circuit 18 at the time of driving and travelling. As a result, it is possible to reduce the consumption current in the current sensor 51. According to the second pattern P2, it is possible to diagnose a fault such as a short-circuit in the shunt resistor 4 at the time of driving and travelling. As a result, it is possible to enhance the safety of the vehicle.

According to the third pattern P3, it is possible to stop the operation of the resistance value correction circuit 18 at the time of driving and travelling, and it is possible to diagnose a fault related to, for example, the short-circuit in the shunt resistor 4 at the time of driving and pausing. Therefore, it is possible to attain the effect in which the consumption current in the current sensor 51 can be reduced although in a lesser amount as compared with the first pattern P1, and it is possible to attain the effect in which the safety of the vehicle is enhanced although in a lesser amount as compared with the second pattern P2.

The resistance value of the shunt resistor 4 can be calculated during power-off with any one of the first pattern P1, the second pattern P2, and the third pattern P3. Therefore, with any one of the first pattern P1, the second pattern P2, and the third pattern P3, the resistance value of the shunt resistor 4 can be calculated with higher accuracy without being affected by noise generated in the motor and the power converter. As a result, it is possible to correct the resistance value for current detection with higher accuracy.

Other Embodiments

The present disclosure is not limited to the embodiments that have been described above and illustrated in the drawings, but can arbitrarily be modified, combined, or expanded without departing from the gist of the present disclosure.

The numerical values and the like illustrated in each of the above embodiments are merely examples, and the present disclosure is not limited thereto.

The specific configuration of the signal application unit 6 may not be limited to the configuration described in each of the above embodiments, and may be any configuration that can apply an AC signal to the series circuit of the shunt resistor 4 and the correction resistor 5. For example, the signal application unit 6 can be configured by, for example, a power supply source for supplying an AC voltage to a series circuit of, for example, the shunt resistor 4 and the correction resistor 5.

The specific configuration of the first synchronous detection circuit 12 may not be limited to the configuration described in each of the above embodiments, and may be any configuration that can receive an input of the signal of the terminal of the shunt resistor 4 and perform synchronous detection at the same frequency as the AC signal to extract and output a signal. The specific configuration of the second synchronous detection circuit 14 may be any configuration that can receive an input of the signal of the terminal of the correction resistor and perform synchronous detection at the same frequency as the frequency of the AC signal to extract and output the signal.

Although the disclosure has been described in accordance with the embodiments, it is understood that the present disclosure is not limited to such embodiment or structures. The present disclosure encompasses various modifications and variations within the scope of equivalents. Furthermore, various combination and formation, and other combination and formation including one, more than one or less than one element may be made in the present disclosure.

What is claimed is:

1. A current sensor comprising:
   a current detection unit configured to detect a detection target current based on
      a terminal voltage of a shunt resistor located in series with a path through which the detection target current flows, and
      a detection resistance value being adopted for current detection and corresponding to a resistance value of the shunt resistor;
   a relay located in series with the path through which the detection target current flows;
   a relay control unit configured to turn on or off the relay;
   a resistance value correction circuit configured to
      calculate the resistance value of the shunt resistor as a calculated resistance value, and
      correct the detection resistance value based on the calculated resistance value; and
   a memory configured to store the detection resistance value, wherein
   the detection resistance value is originally stored in advance in the memory based on an initial resistance value of the shunt resistor,
   as the detection resistance value is corrected by the resistance value correction circuit, the detection resistance value as corrected is stored in the memory,
   the current detection unit is further configured to detect the detection target current while the relay is being turned on by the relay control unit, and
   the resistance value correction circuit is further configured to calculate the resistance value of the shunt resistor while the relay is being turned off by the relay control unit.

2. The current sensor according to claim 1, wherein the resistance value correction circuit includes:
   a correction resistor located at a path different from the path through which the detection target current flows, the correction resistor connected in series with the shunt resistor, the correction resistor being higher in resistance accuracy than the shunt resistor;
   a signal application unit configured to apply an alternating current signal to a series circuit in which the shunt resistor and the correction resistor are connected in series;
   a first voltage detection unit configured to detect a value of the terminal voltage of the shunt resistor as a first voltage detection value, while the alternating current signal is applied to the series circuit;
   a second voltage detection unit configured to detect a value of a terminal voltage of the correction resistor as a second voltage detection value, while the alternating current signal is applied to the series circuit; and
   a correction unit configured to
      calculate the resistance value of the shunt resistor as the calculated resistance value based on the first voltage detection value and the second voltage detection value, and
      correct the detection resistance value based on the calculated resistance value.

3. The current sensor according to claim 1, wherein the resistance value correction circuit is further configured to calculate the resistance value of the shunt resistor also while the relay is being turned on by the relay control unit.

4. The current sensor according to claim 1, wherein at least one of a motor adapted to a vehicle or a power converter for supplying power to the motor is located at the path through which the detection target current flows,
   the current sensor further comprises:
      a state signal input unit configured to receive an input of a state signal indicating a state of each of the motor and the power converter; and
      a state switchover unit configured to switch a state of the current sensor to one of a first state, a second state and a third state,
   the first state is a state in which the current detection unit detects the detection target current while the relay is being turned on by the relay control unit,
   the second state is a state in which the current detection unit detects the detection target current and the resistance value correction circuit calculates the resistance value of the shunt resistor while the relay is being turned on by the relay control unit, and
   the third state is a state in which the resistance value correction circuit calculates the resistance value of the shunt resistor while the relay is being turned off by the relay control unit.

5. The current sensor according to claim 4, wherein the state switchover unit is further configured to:
   switch the state of the current sensor to the first state, based on a condition that the state signal indicates that the motor and the power converter are being driven; and
   switch the state of the current sensor to the third state, based on a condition that the state signal indicates that power supplying to the motor and the power converter has been stopped.

6. The current sensor according to claim 4, wherein the state switchover unit is further configured to:

switch the state of the current sensor to the second state, based on a condition that the state signal indicates that the motor and the power converter are being driven; and switch the state of the current sensor to the third state, based on a condition that the state signal indicates that power supplying to the motor and the power converter has been stopped.

7. The current sensor according to claim 4, wherein the state switchover unit is further configured to:

switch the state of the current sensor to the first state, based on a condition that the state signal indicates that the motor and the power converter are being driven;

switch the state of the current sensor to the second state, based on a condition that the state signal indicates that the motor has not been driven and the power converter is being driven; and switch the state of the current sensor to the third state, based on a condition that the state signal indicates that power supplying to the motor and the power converter has been stopped.

8. The current sensor according to claim 1, wherein the detection resistance value corresponds to a changing resistance value of the shunt resistor, and is originally set to the initial resistance value of the shunt resistor when the shunt resistor is first put into use, and the detection resistance value is corrected by the resistance value correction circuit based on the changing resistance value and then stored into the memory.

9. The current sensor according to claim 1, wherein the detection resistance value corresponds to a deteriorating resistance value of the shunt resistor, and is originally set to the initial resistance value of the shunt resistor when the shunt resistor is first put into use, and the detection resistance value is corrected by the resistance value correction circuit based on the deteriorating resistance value and then stored into the memory.

* * * * *